United States Patent
Devlin

(10) Patent No.: US 7,050,404 B1
(45) Date of Patent: May 23, 2006

(54) METHOD AND SYSTEM FOR DETERMINING NETWORK TOPOLOGY

(75) Inventor: Joseph E. Devlin, Westford, MA (US)

(73) Assignee: Rocket Software, Inc., Newton, MA (US)

( * ) Notice: Subject to any disclaimer, the term of this patent is extended or adjusted under 35 U.S.C. 154(b) by 927 days.

(21) Appl. No.: 09/973,627

(22) Filed: Oct. 9, 2001

Related U.S. Application Data

(60) Provisional application No. 60/238,926, filed on Oct. 10, 2000.

(51) Int. Cl.
*H04L 12/26* (2006.01)

(52) U.S. Cl. .................................... 370/254

(58) Field of Classification Search ................ 370/254, 370/255, 257; 709/223, 224
See application file for complete search history.

(56) References Cited

U.S. PATENT DOCUMENTS

| | | | |
|---|---|---|---|
| 5,185,860 A * | 2/1993 | Wu | 709/224 |
| 5,727,157 A * | 3/1998 | Orr et al. | 709/224 |
| 5,796,736 A * | 8/1998 | Suzuki | 370/254 |
| 6,563,798 B1 * | 5/2003 | Cheng | 370/255 |
| 2002/0009085 A1 * | 1/2002 | Barkai et al. | 370/395.1 |
| 2003/0033427 A1 * | 2/2003 | Brahmaroutu | 709/238 |
| 2003/0058496 A1 * | 3/2003 | Obeda et al. | 359/124 |
| 2004/0024908 A1 * | 2/2004 | Valdevit et al. | 709/248 |
| 2004/0255184 A1 * | 12/2004 | Bejerano et al. | 714/4 |

* cited by examiner

*Primary Examiner*—Melvin Marcelo
(74) *Attorney, Agent, or Firm*—Barlow, Josephs & Holmes, Ltd.

(57) ABSTRACT

In accordance with one embodiment, a method and system are provided for determining the connectivity of switches in a computer network. The switches include multiple ports for connection to other switches and network elements. Connectivity of the switches is determined by determining all the possible port pairings, determining a score for each port pairing, and selecting the port paring having the highest score.

4 Claims, 8 Drawing Sheets

METHOD AND SYSTEM FOR DETERMINING NETWORK TOPOLOGY

CROSS-REFERENCE TO RELATED APPLICATION

This application is related to and claims priority from earlier filed provisional patent application Ser. No. 60/238,926, fled Oct. 10, 2000.

BACKGROUND OF THE INVENTION

1. Field of the Invention

The present invention relates generally to computer networks and their management. More particularly, it relates to discovery of network elements and determining their connectivity.

2. Description of Related Art

Computer networks provide communication paths between various machines (e.g., workstations, printers, servers) in the network. A local area network (LAN) (also known as a campus) is a computer network that spans a relatively small area. A wide-area network (WAN) is a network of LANs.

Information sent from one machine in a network to another is typically sent through some interconnect device. These devices amplify and/or route traffic within the network. Interconnect devices include, e.g., switches, routers, bridges and repeaters.

A node is a processing location in a network. A node can comprise various machines such as, e.g., workstations, servers or printers physically linked to a network interconnect device.

As used herein, a network "element" can comprise various network devices including interconnect devices and network nodes.

Keeping track of all of the nodes in a network is difficult, particularly when the network is fast growing or changing, i.e., network nodes are being quickly added or changed. In a very short LAN, a network administrator might be able to physically trace the cable of the network to determine which nodes are located on the network and how they are connected. However, LANs can extend some distance and through many floors and offices within a building, making physical tracing typically virtually impossible.

There are known methods of automatically determining network topology such as, e.g., the automatic discovery processes disclosed in U.S. Pat. No. 5,185,860 and U.S. Pat. No. 5,727,157. Determining network topology typically includes two steps: (1) discovering individual network elements; and (2) determining their connectivity.

BRIEF SUMMARY OF THE INVENTION

In accordance with one embodiment of the invention, a method and system are provided for determining the connectivity of switches in a computer network. The switches include multiple ports for connection to other switches and network elements. Connectivity of the switches is determined by determining all the possible port pairings, determining a score for each port pairing, and selecting the port paring having the highest score.

These and other features of the present invention will become readily apparent from the following detailed description wherein embodiments of the invention are shown and described by way of illustration of the best mode of the invention. As will be realized, the invention is capable of other and different embodiments and its several details may be capable of modifications in various respects, all without departing from the invention. Accordingly, the drawings and description are to be regarded as illustrative in nature and not in a restrictive or limiting sense with the scope of the application being indicated in the claims.

BRIEF DESCRIPTION OF THE DRAWINGS

For a fuller understanding of the nature and objects of the present invention, reference should be made to the following detailed description taken in connection with the accompanying drawings wherein.

DETAILED DESCRIPTION OF PREFERRED EMBODIMENTS

Figure 1:
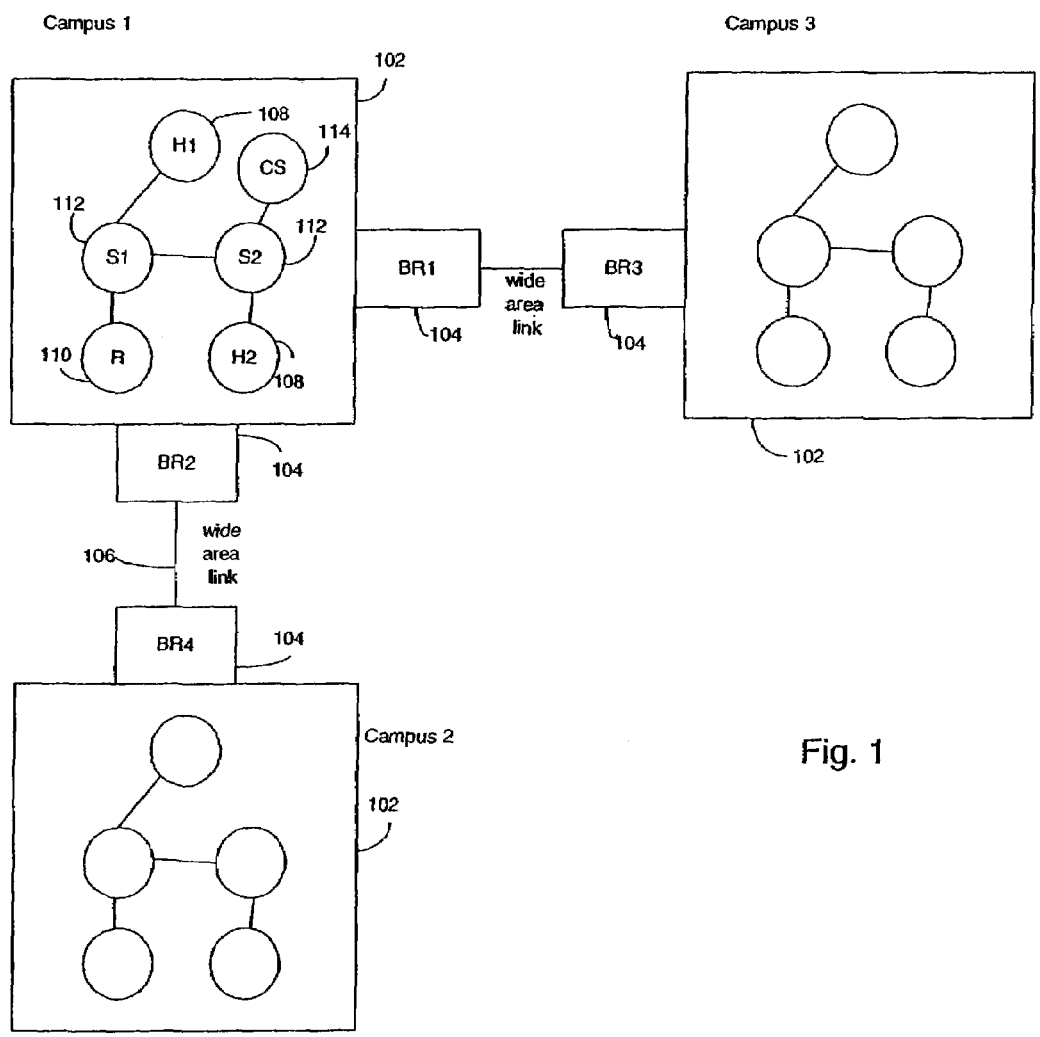
FIG. 1 is a schematic diagram of a representative network in which the inventive method and system can be implemented.

FIG. 1 illustrates a representative WAN 100, in which the present method and system can be implemented. The WAN comprises multiple campuses or LANs 102 linked by wire area links. Each LAN typically has one or more border routers 104 that are linked to a border router of another LAN by a wide area link 106. The wide area link can comprise, e.g., frame relay service. Each LAN can include many network nodes 108 such as, e.g., file servers, Web servers, work stations, printers, as well as several interconnect devices such as, e.g., routers 110 and switches 112.

The system for determining network topology in accordance with the present invention includes a computer system 114 connected to the network. The computer system includes a processor, an input device such as a keyboard, a display, memory, and an interface to the network. The memory stores software that operates the present system. The memory also stores information on network elements collected by the system.

In accordance with the invention, there are generally two steps in mapping the topology of the network: discovering the network elements and determining their connectivity, particularly the connectivity of network switches. These steps at least partially overlap in time as discussed below.

Discovering Network Elements

The inventive system uses a multi-threaded architecture to accelerate the discovery of network elements and provide a growing database of information on network elements, making the other task of determining the network topology significantly more efficient.

In general, the system uses a 'two-wave look ahead' process to discover network elements. In the first or 'speculative' wave, the system recursively identifies network elements and obtains certain relevant management property information. This information is then used in the 'definitive' wave to determine network topology. The two waves at least partially overlap in time. While the system performs the definitive wave process for a given campus, it uses the speculative wave process to gather information on network elements in other campuses for use in subsequent definitive wave processing. The system uses multi-threading to perform multiple tasks in parallel. This results in particularly efficient network element discovery because the query/response time using Simple Network Management Protocols (SNMP) is generally very slow.

Generally, in the speculative wave process, a known network device such as a known router in a given LAN is interrogated to learn the existence of other connected network elements. These in turn are interrogated to learn of even more connected network elements. The process thereby spreads starting with one LAN and jumping to other LANs within the WAN. While the speculative wave is operating, the definitive wave uses the information gathered by the speculative wave to determine network topology beginning with one LAN and then progressing to others.

Figure 2:
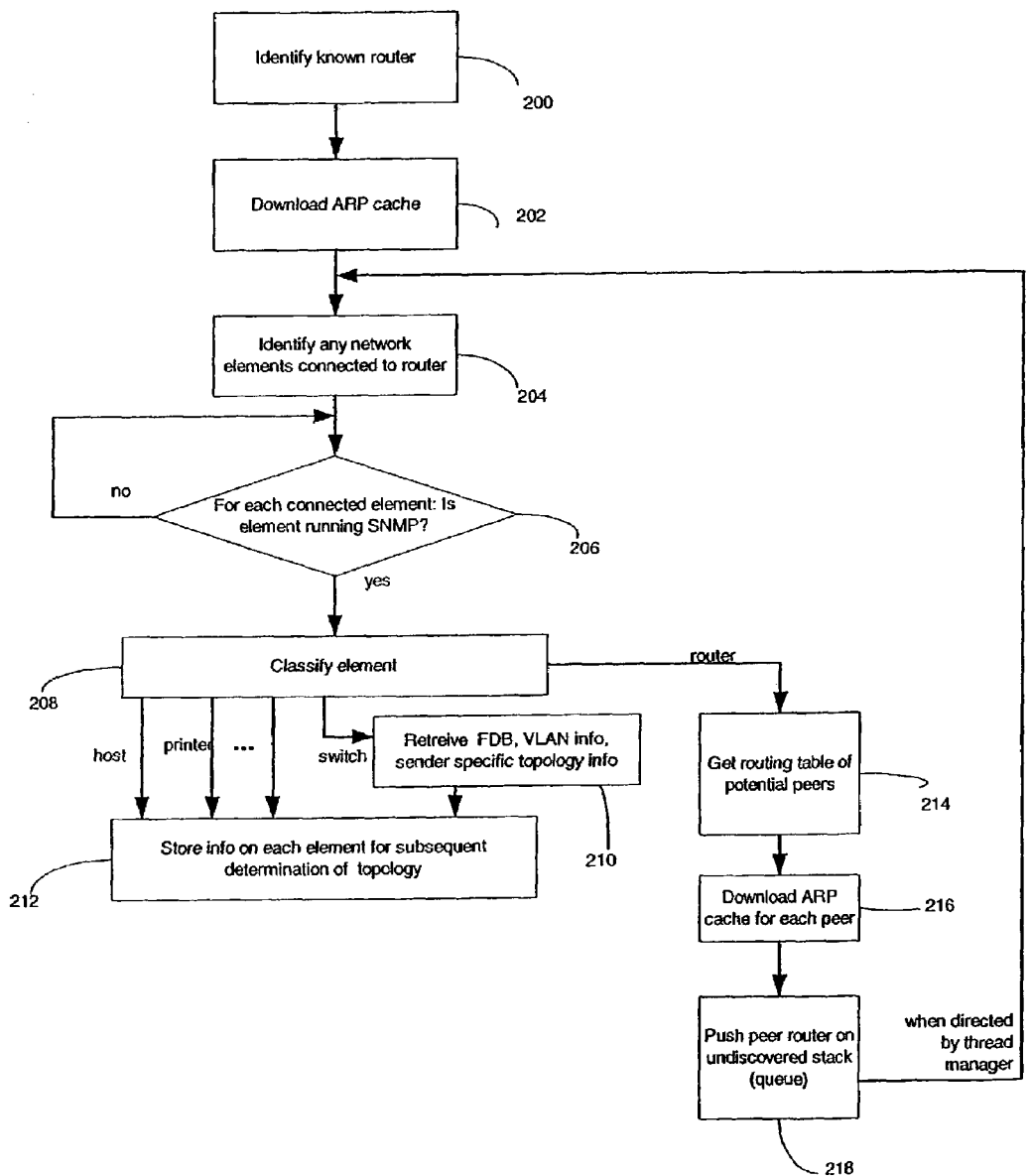
FIG. 2 is a flow chart generally illustrating the speculative wave process in accordance with the invention.

FIG. 2 is a flow chart generally illustrating the speculative wave discovery process. At step 200, a known router in a given LAN is identified. At step 202, the ARP cache of the router is downloaded. The downloaded data includes an array of IP addresses and other information on network elements connected to the router. The downloaded data is used to determine if there are other network elements connected to the router at step 204. Then at step 206, using multi-threading, each of these devices is queried to determine whether it is running SNMP, i.e., whether it is a managed network element. If an answer is not received, then the system optionally repeatedly reasks the question for some period of time, e.g., two minutes. This is done because it is more difficult to ascertain that the device is unmanaged, versus receiving a definite positive response. If the network element is found to run SNMP, it is then queried for classification at step 208. If it is determined to be not managed, it preferably becomes a leaf node in the topology.

The element is classified as, e.g., a node (such as a host or printer) or as an interconnect device (such as a switch or router). If the element is classified as a switch, certain information is retrieved from the switch such as, e.g., its FDB, VLAN information, and sender specific topology information at step 210. The information gathered from the elements is stored at step 212, for subsequently determining network topology.

If the element is classified as a router, then at step 214, its routing table of potential peers is retrieved. Then, for each peer router, its ARP cache is downloaded at step 216. The peer router is then pushed on an 'undiscovered' stack, i.e., a queue for subsequent discovery processing at 218.

The system's thread manager process, which is described below with respect to FIG. 3, manages the threads used in the speculative wave process. The number of threads available for use is limited by memory constraints of the system, and can be, e.g., 500 to 1,000 threads. The thread manager preferably optimizes use of the threads, keeping each as busy as possible. As shown in the FIG. 2 flow chart, when directed by the thread manager (when threads are available), the network elements connected to the next router on the stack are identified and queried after step 218 in the manner previously described.

Figure 3:
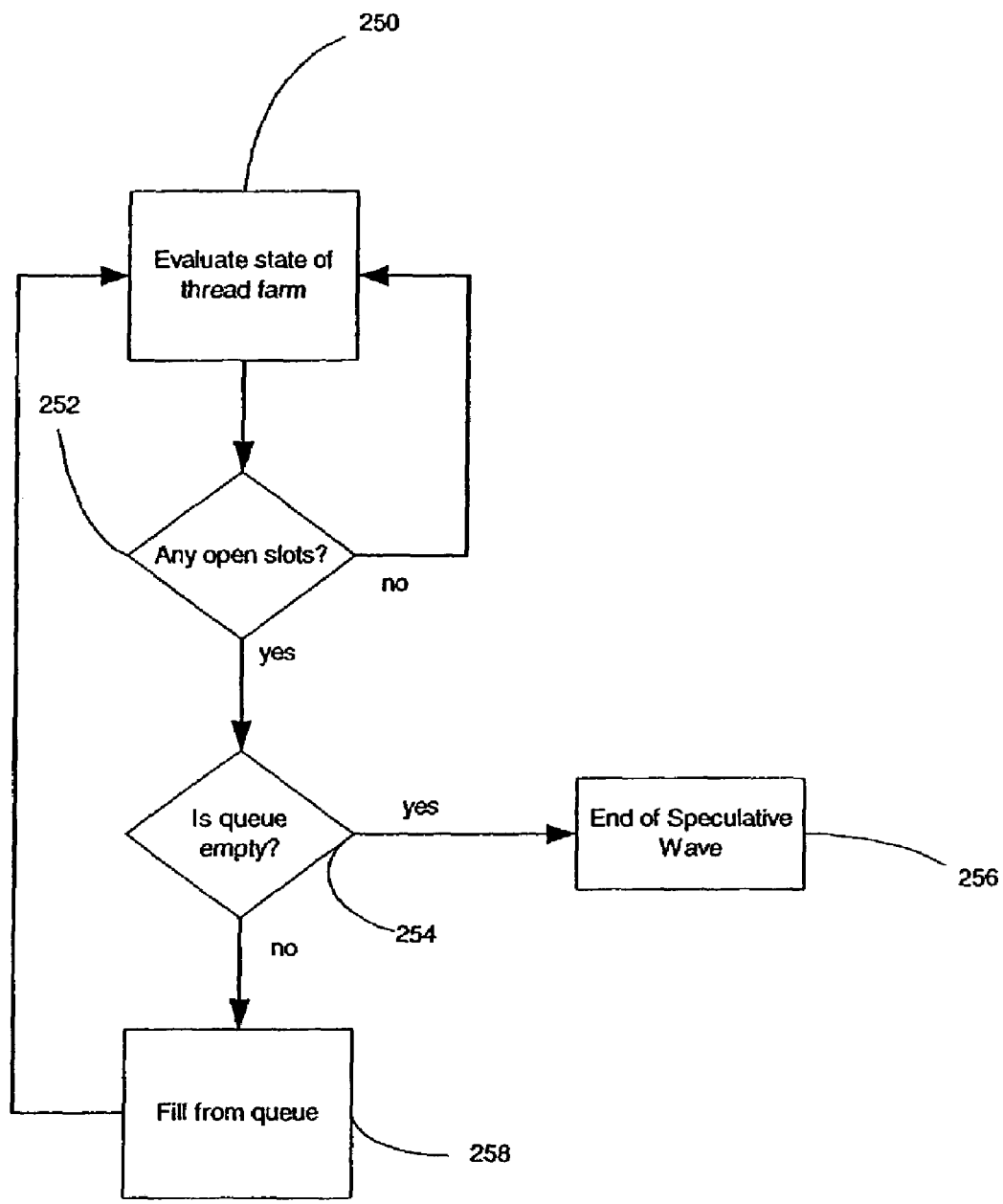
FIG. 3 is a flow chart generally illustrating the thread manager process in accordance with the invention.

FIG. 3 illustrates the thread manager process. At step 250, the state of the thread farm is evaluated. If no open slots (i.e., threads) are found to be available at 252, the thread farm is again evaluated. If there are open slots, the queue is examined at 254 to see if there are further routers on the undiscovered stack remaining for discovery. If not, the speculative wave process ends at 256. (The definitive wave process, however, continues until topology has been determined.) If there are any routers on the stack, an open slot is filled at 258, and the process returns to evaluating the status of the thread farm.

The thread manager synchronizes operations between threads, preventing threads from repeating tasks previously performed by other threads.

Determining Network Connectivity

Once network elements are discovered in the speculative wave process as described above, the connectivity of the network is determined using the information gathered in the speculative wave process. For purposes of network management, it is significantly more important to accurately determine the connectivity of switches to other switches than it is to determine the connectivity of each node to the network. Accordingly, the description below is directed particularly to determining switch topology.

A network switch is an interconnect device that forwards packets between various LAN elements. A switch includes a central processing unit (CPU), and multiple ports, which can be connected to various other network elements. Each port has an associated forwarding database (FDB), which is also known as a source address table.

The switch CPU runs a switching algorithm that directs data between network elements on multiple paths simultaneously. The FDB builds its database of destination addresses based on data received from sending elements. For example, if network element "X" send a packet of data through a given port of a switch, then the FDB associated with that port is updated to include element X, thereby indicating the connectivity of the port to element X. The connection of element X to the port can be direct or transitive, i.e., via some other network element.

Figure 4:
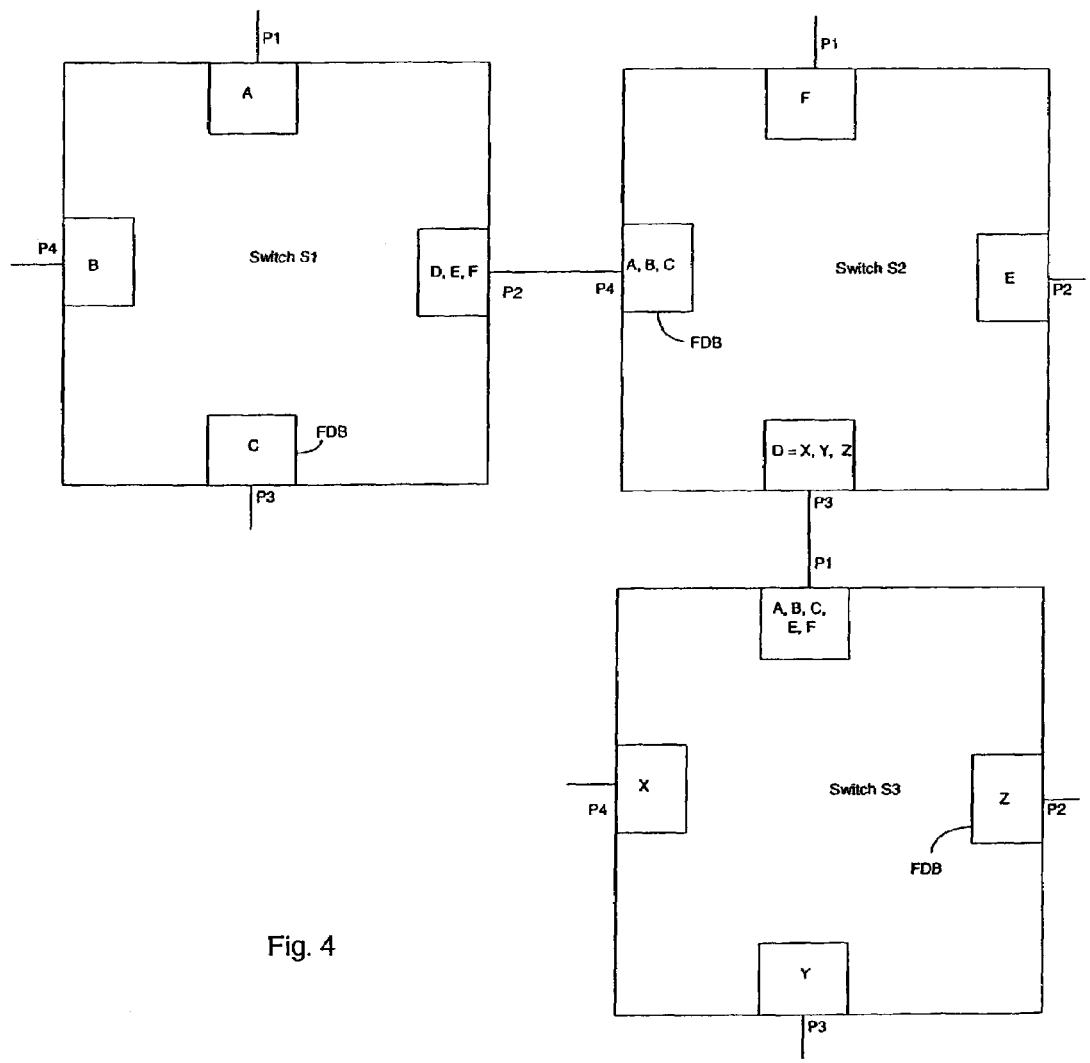
FIG. 4 is a schematic diagram illustrating a sample connection of three switches.

FIG. 4 illustrates an example of three switches connected in a LAN. For simplicity, the illustrated switches are each shown to have only four ports. As is well known, a typical switch will include many more ports, often hundreds of ports. In the FIG. 4 arrangement, port P2 of switch S1 is connected to port P4 of switch S2, and port P3 of switch S2 is connected to port P1 of switch S3.

Figure 5:
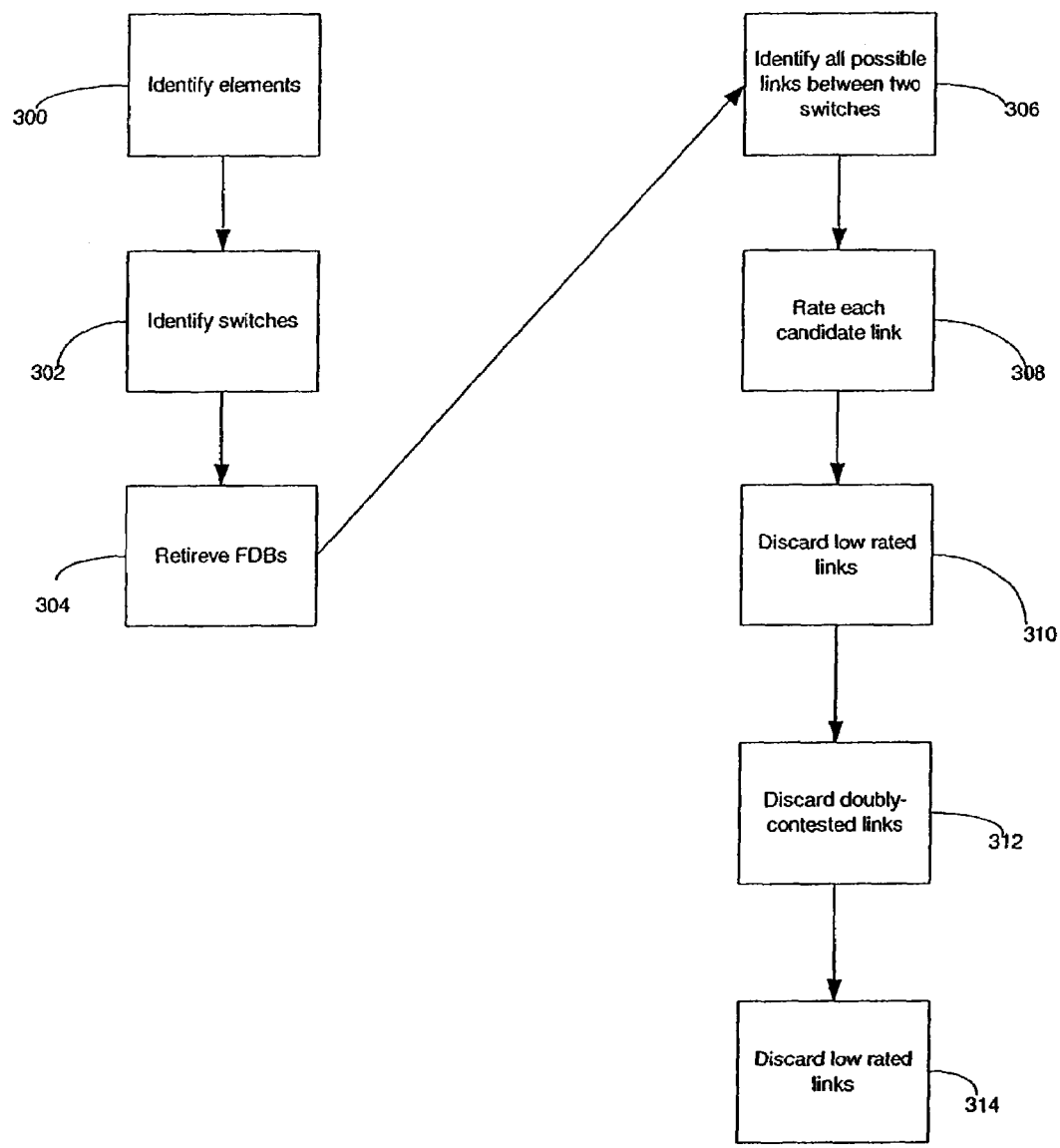
FIG. 5 is a flow chart generally illustrating the process of determining connectivity between two switches in accordance with the invention.

FIG. 5 is a flow chart generally illustrating the process of determining connectivity of network switches in accordance with the invention. At step 300, each network element is discovered, e.g., using the "speculative wave" discovery process described above. Then, at step 302, the system identifies which of the discovered elements are switches and which are other elements such as nodes. At step 304, the system retrieves each of the FDBs from each of the switches. At step 306, the system identifies all possible port to port links (candidate links) between two given switches by pairing each port on a switch with each port on the other switch. Each candidate link is then analyzed in the following steps to eliminate as many incorrect links as possible. At step 308, each possible link is analyzed and given a rating or score.

The rating process of a candidate link is now described with respect to the example connected switches S1 and S2 of FIG. 4. As shown, port P2 of switch S1 is connected to port P4 of switch S2. In the process of determining switch connectivity, each possible port to port link between the switches is analyzed. In rating each candidate port to port link between two switches, two properties of connected switches are preferably considered. First, the FDB of a port on a switch is the complement of the FDB of the corresponding connected port of the other switch. Second, the FDB of a port on a switch should be equal to the union of the FDBs of all ports other than the connected port of the other switch.

In the FIG. 4 example, if the link between port P2 of switch S1 and port P4 of switch S2 is considered as a candidate link, the analysis is as follows: (1) the FDB of port P2 of switch S1 is the complement of the FDB of the corresponding connected port P4 of switch S2; and (2) the FDB of port P2 on switch S1 should be equal to the union of the FDBs of all ports other than the connected port P4 of switch S2, i.e., ports P1, P2, and P3 of switch S2. The properties can be represented in the following equations:

For switch S1:

FDB of P2 of S1={X, Y, Z, E, F}

Complement of P2 of S1–X U Y U Z U E U F {X, Y, Z, E, F}

Similarly, for switch S2:

FDB of P4 of S2={A, B, C}

Complement of P4 of S2=A U B U C={A, B, C}

The candidate link is then scored for each switch as follows:

Score=$J/K$, where J is the cardinality of intersection of the FDB and complement for a switch, and K is the cardinality of the complement for that switch. J is calculated by counting the number of common elements in the FDB and in the complement for a switch port. K is calculated by counting the number of elements in that complement.

In the above example, the score for each switch is calculated as follows:

Score S1=5/5=1.0

Score S2=3/3=1.0

Total score=1.0+1.0=2.0

Figure 6:
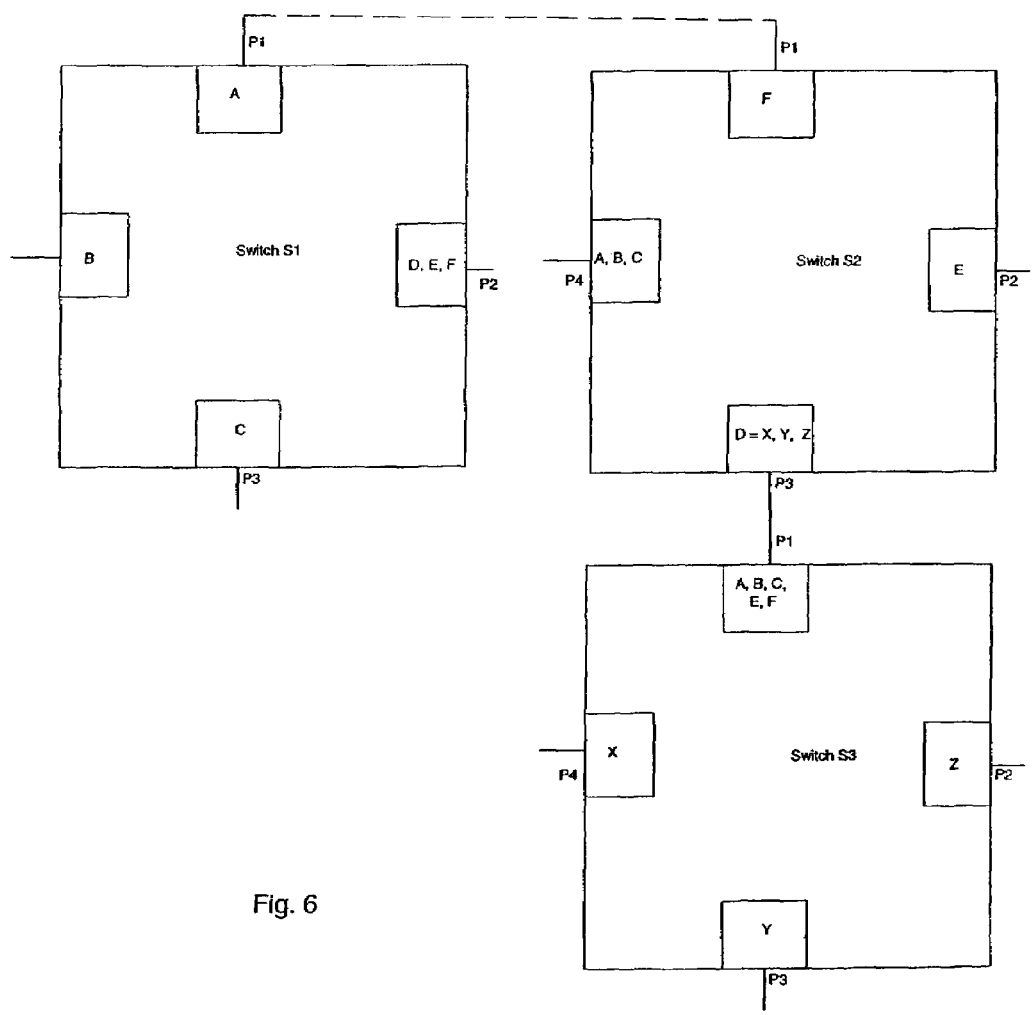
FIG. 6 is a schematic diagram illustrating a sample connection of switches illustrating the analysis of an alternate candidate link.

An inaccurate candidate link will generally produce a lower score as indicated, e.g., in the candidate link shown (in phantom) in FIG. 6. In this figure, the candidate link considered is between port P1 of switch S1 and port P1 of switch S2. This candidate link is scored as follows:

FDB of P1 of S1 {A}

Complement of P1 of S1={A, B, C, X, Y, Z, E}

FDB of P1 of S2={F}

Complement of P1 of S2={B, C, X, Y, Z, E, F}

Score S1=1/7=0.14

Score S2=1/7=0.14

Total score=0.14+0.14=0.28

As shown, the score for the incorrect candidate link of FIG. 6 is lower than the score calculated for the correct candidate link of FIG. 4.

The ratings method described above is one example of a process for rating or scoring candidate links. Those skilled in the art will recognize that other methods for rating or scoring links are also possible, based generally on the principle that the FDB of a port should be a best match of the complement of the port to which it is connected. One example of this would be counting the mismatches between the FDB of a port and the complement of the connected port, rather than using a ratio.

In accordance with the invention, a "best fit" rather than an "exact fit" approach is taken in determining correct links. An exact fit approach would be suitable in a static network where equipment is never moved. In a static network, the set of cardinalities can always be expected to be equal for a correct link (i.e., providing a total score of 2.0 in the above analysis). However, in practice, FDBs often contain incorrect data, resulting, e.g., from a node being moved, connected, or removed, while the node's address is retained in the FDB for some period of time (the duration depending on the configuration of the device). The present system represents an advance in the state of the art because it handles this real-world condition without breaking down.

Figure 7:
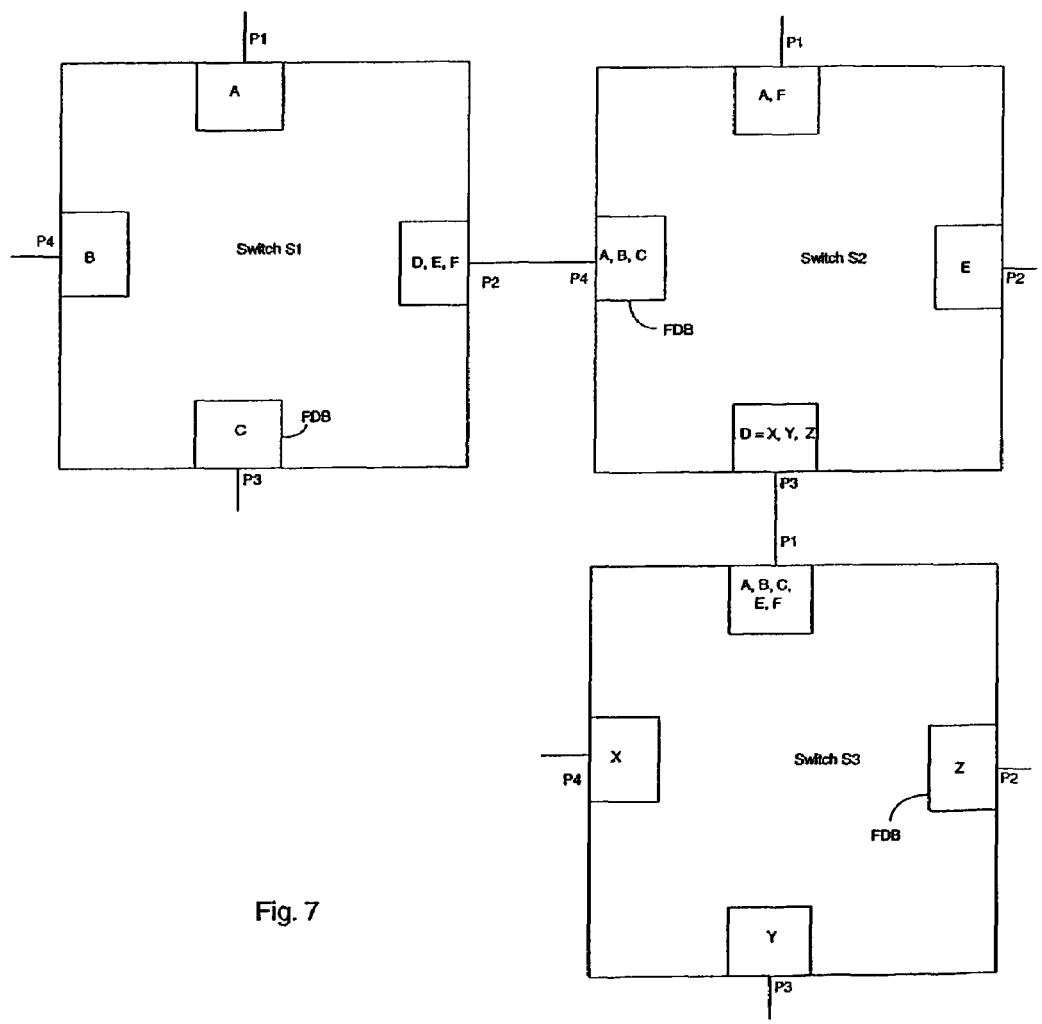
FIG. 7 is a schematic diagram illustrating a sample connection of switches with a moved node.

FIG. 7 illustrates the scoring of a candidate link between switches when a node has been moved. In this example, the same switch connection is used as in FIG. 4, but with node A moved from port P1 of switch S1 to port P1 of switch S2. The FDB of port P1 of switch S2 is updated to include node A. However, the FDB of P1 of switch S1 still retains (incorrectly) node A for some period of time even though it has been moved. Scoring performed during this time period will be as follows:

FDB of P2 of S1={E, F, X, Y, Z}

Complement of P2 of S1={A, E, F, X, Y, Z}

Score S1=5/6=0.83

FDB of P4 of S2={A, B, C}

Complement of P4 of S2={A, B, C}

Score S2=3/3=1.0

Total Score=1.83<2.0

As illustrated above, under real world conditions, even correct candidate links can have a less than perfect score. The present system takes a "best fit" approach in determining correct links to account for these conditions.

After all of the candidate links are scored or rated in step 308 of FIG. 5, the lower scores are discarded at step 310. Scores below some given threshold such as, e.g., a mean score, are presumed to be incorrect and discarded. This step typically significantly reduces the number of candidate links.

Figure 8:
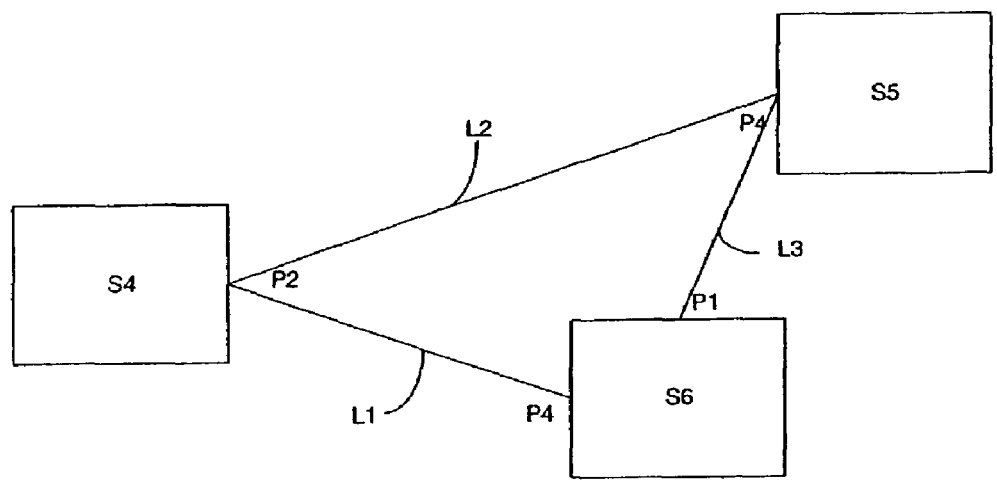
FIG. 8 is a schematic diagram illustrating contested links.

Next at step 312, a further analysis is performed on the remaining candidate links. This analysis involves examining the candidate links to identify links that are "contested." A contested link is one that is connected to the same port as another candidate link as illustrated, e.g., in FIG. 8. The figures shows three switches S4, S5, and S6. Switch. S4 contains port P2. Switch 55 contains port P4. Switch 56 contains ports P1 and P4. Switches S4 and 56 are connected by a candidate link L1, and switches S4 and 55 are connected by a candidate link L2. Also, switches S5 and S6 are connected by candidate link L3. With this arrangement, links L1 and L2 are vying for the same port P2 of switch S4, and links L2 and L3 are vying for the same port P4 of switch S5. Links L1, L2 and L3 are thereby each contested links. Links L1 and L3 are 'singly' contested since the are each vying with only one other link for a port. Link L2 is 'doubly' contested since it is vying with other links at both of its ports.

Contested links are not possible in network topology since branching cannot occur at a port. Accordingly, in the further analysis of candidate links, when a doubly contested link vies for the same port as a singly contested link, the doubly contested is presumed incorrect and discarded. In the FIG. 8 example, doubly contested link L2 would be discarded in favor of retaining links L1 and L3.

In accordance with the invention, if two singly contested links vie for the same port, both are retained in the analysis of step 312. This is because it is important not to discard the wrong link. The goal of determining network topology as applied to diagnostics is not necessarily to determine an exact topology, but to be able to identify where the topology is faulty when trying to reach a device.

Optionally at step 314, when two singly contested candidate links vie for the same port, the links are rated or scored, and the link having the lower score is discarded. The candidate links can be scored based on, e.g., the scoring previously performed at step 308 or using other scoring methods as previously described. This step can thereby even further reduce the number of incorrect candidate links.

Reapplication of Manual Edits on a Network Topology Map

The computer system 114, which performs the auto discovery of network topology as previously described, preferably includes a graphical user interface allowing the discovered topology to be displayed to a network administrator or other user in the form of a network topology map. It may, in some instances, be desirable to manually edit the topology map. For example, it is possible that there are errors in the map from the auto discovery process. This may result, e.g., from some network elements not supporting standard network inquiries. Manual editing of the map may also be desirable if the network has been physically reconfigured by, e.g., adding a new switch, and the network administrator does not immediately wish to repeat the auto discovery.

Editing a topology map may include many actions such as, e.g., changing connectivity of elements by adding, deleting and moving links. It can also include adding and deleting network elements or changing their properties (such as, e.g., their location). A new element can be added by instantiating the element from a palette to the network map.

After a first auto discovery, subsequent manual editing, and a second auto discovery are performed, two situations may arise. First, the second auto discovery accurately maps the network, in which case the earlier manual edits become irrelevant since the new map would include these edits. Second, the second auto discovery repeats the error made by the first auto discovery, necessitating that the same manual edit be made again.

In accordance with one aspect of the invention, a method and system are provided to reapply previously made manual edits. Manual edits are stored in a buffer (preferably using XML structure) in the order made. The edits can be replayed in order against the auto discovered map and applied as desired.

One problem in reapplying the manual edits is that the network topology may be changed by the second auto discovery and it may be difficult to identify the network elements to which the edits should be applied. Identifying the particular network elements can be difficult because their IP addresses generally are not persistent and SNMP does not provide a unique identifier for each element. In accordance with the invention, a plurality of available identifiers are used to provide the best possible match of elements to the edits. These identifiers can include, e.g., the model number, serial number, domain names, management names, and IP names. The system uses whatever identifier is available to best identify the network element to which the edit applies.

Having described preferred embodiments of the present invention, it should be apparent that modifications can be made without departing from the spirit and scope of the invention.

The invention claimed is:

1. A method of determining the connectivity of switches in a computer network, each switch including a plurality of ports for connection to other switches and network elements, comprising:
   determining all the possible port pairings;
   determining a score for each port pairing; and
   selecting the port pairing having the highest score.

2. The method of claim 1 wherein the score for each port is determined by determining how well the pairing conforms to a set of given properties.

3. The method of claim 1 wherein said steps are performed by a computer in the network.

4. The method of claim 1 wherein selecting the port pairing having the highest score includes determining a threshold, and discarding scores below the threshold.

\* \* \* \* \*